(12) United States Patent
Utsumi et al.

(10) Patent No.: US 7,898,638 B2
(45) Date of Patent: Mar. 1, 2011

(54) LIQUID-CRYSTAL DISPLAY DEVICE

(75) Inventors: Yuka Utsumi, Hitachi (JP); Shintaro Takeda, Hitachi (JP); Hiroyuki Kagawa, Hitachinaka (JP); Daisuke Kajita, Hitachi (JP); Ikuo Hiyama, Hitachinaka (JP); Kikuo Ono, Mobara (JP)

(73) Assignee: Hitachi Displays, Ltd., Chiba-Ken (JP)

( * ) Notice: Subject to any disclaimer, the term of this patent is extended or adjusted under 35 U.S.C. 154(b) by 113 days.

(21) Appl. No.: 12/192,155

(22) Filed: Aug. 15, 2008

(65) Prior Publication Data

US 2009/0059156 A1 Mar. 5, 2009

(30) Foreign Application Priority Data

Aug. 31, 2007 (JP) ............................. 2007-224999

(51) Int. Cl.
C09K 19/02 (2006.01)
H01L 51/40 (2006.01)

(52) U.S. Cl. ........................................ 349/177; 438/30

(58) Field of Classification Search .................. 349/177
See application file for complete search history.

(56) References Cited

U.S. PATENT DOCUMENTS

2002/0047974 A1  4/2002  Matsumoto
2003/0039769 A1  2/2003  Lee et al.
2003/0224125 A1  12/2003  Heckmeier et al.

FOREIGN PATENT DOCUMENTS

JP  11-160716  6/1999
JP  2001-354962  12/2001

OTHER PUBLICATIONS

Yoneya et al., "Depolarized light scattering from liquid crystals as a factor for black level light leakage in liquid-crystal displays", Journal of Applied Physics 98, 016106 (Jul. 2005).
Yuka et al., "P.27: Analysis of Light-Leakage Caused by Colour Filters for Improving Contrast Ratio of LCD TV's", Eurodisplay' 05, p. 27.

Primary Examiner—Mark A Robinson
Assistant Examiner—Erin D Chiem
(74) Attorney, Agent, or Firm—Antonelli, Terry, Stout & Kraus, LLP.

(57) ABSTRACT

Disclosed herein is a liquid-crystal display device capable of reducing leakage of light under a black state due to scattering from a liquid-crystal layer, and having high-contrast ratio, excellent image quality performance. The liquid-crystal display device comprises: a liquid-crystal panel including one pair of polarizers disposed on one pair of substrates, a liquid-crystal layer held in sandwiched form between the pair of substrates, and a group of electrodes formed on at least one of the pair of substrates for applying an electric field to the liquid-crystal layer; and a light source unit disposed outside the pair of substrates. The liquid-crystal layer includes a liquid-crystal material having an ordinary-light refractive index of at least 1.46, but up to 1.49, an extraordinary-light refractive index of at least 1.54, but up to 1.59, and a mean photoelastic constant of at least 8, but up to 25, and exhibiting a nematic phase.

10 Claims, 8 Drawing Sheets

LIQUID-CRYSTAL DISPLAY DEVICE

BACKGROUND OF THE INVENTION

1. Field of the Invention

The present invention relates to a liquid-crystal display device having a liquid-crystal layer between one pair of substrates.

2. Description of the Related Art

In addition to the advantage of a thin and lightweight design over the cathode-ray tube (CRT) type that had formerly been the mainstream in display devices, the progress of image quality improvement technology has expanded the applications and market of liquid-crystal displays.

In recent years, the demand for better color reproducibility and higher contrast ratios in liquid-crystal displays has been increasing with the expansion of their applications as monitors for desktop-type personal computers or for printing or designing, and as liquid-crystal TVs.

For liquid-crystal display devices, since the luminance in a black state is not nil and has a finite value, the front contrast ratio of the display device is defined by the value obtained by dividing the luminance in a white state that is determined by the effective transmittance of the liquid-crystal panel, by the luminance in the black state.

Since luminance depends on a viewing angle, liquid-crystal display devices are usually discriminated in terms of front contrast ratio and viewing-angle contrast ratio. The former is the value defined by the luminance value of the panel front. More specifically, the front contrast ratio is expressed as the luminance defined by a two-degree field of view or a ten-degree field of view, that is, the luminance when measured with a luminance meter.

The latter viewing-angle contrast ratio is a characteristic determined by the luminous intensity diffusion profile of the light source, the degree of viewing-angle compensation by a polarizer, a retardation film, or the like, alignment control of the liquid-crystal molecules, or other factors. The front contrast ratio and the viewing-angle contrast ratio, however, are not completely independent characteristics, and between the two ratios, there lies the positive correlation that as the front contrast ratio increases, the viewing-angle contrast ratio also increases. The improvement of the front contrast ratio is very effective for improving the image quality of the liquid-crystal display device.

The effective transmittance in the white state is the value affected by factors such as: numerical aperture, the optical retardation and other optical constants of the liquid crystal, and if the display device is of the normally closed type, the rate of the region displayed when voltage is effectively applied.

The effectiveness of reducing the luminance in the black state and increasing the luminance in the white state in order to improve the front contrast ratio is obvious, and it is reported in Non-Patent Documents 1 and 2 that the luminance in the black state is increased by the presence of a partial depolarizer in the liquid-crystal panel.

Non-Patent Document 1: M. Yoneya et al., J. Appl. Phys., 98 (2005), p. 016106

Non-Patent Document 2: Y. Utsumi et al., EuroDisplay' 05, p. 27

SUMMARY OF THE INVENTION

In general, the liquid-crystal display devices that are used as liquid-crystal TVs utilize polarized light. That is to say, incident light from the light source disposed in the rear panel of the liquid-crystal panel is controlled into polarized light, which then changes according to the particular alignment state of the liquid-crystal layer and is emitted in the form of light of the desired intensity in order to display images. When an electric field is applied between the electrodes formed on substrates, the alignment state of the liquid crystal is controlled according to the particular strength of the field. The display method that blocks light under the non-applied state of the electric field and lets the light pass through under the applied state of the field is called the normally closed mode or the normally black mode. This mode is generally applied to liquid-crystal TVs. The image quality characteristic that is strongly demanded in TVs is a high contrast ratio, and to achieve this characteristic, it becomes important how to reduce the luminance in the black state when light is blocked for display. This is because, for reduced luminance in the black state, blocking the light in the alignment state of the liquid crystal existing when no electric field is applied thereto can be conducted more effectively than in a varied alignment state of the liquid crystal existing when an electric field is applied.

In the normally closed mode, since black is displayed without an applied electric field, it is important that the degree of polarization of the incident polarized light, that is, the degree of polarization by a polarizer disposed between the light source and the liquid-crystal layer should be very high. The polarized light, if completely retained during passage through the liquid-crystal layer under the initial alignment state thereof, is blocked by a polarizer whose axis of polarization is disposed orthogonally above the liquid-crystal layer (i.e., the viewer's side). The polarized light that has thus been blocked creates the luminance in the black state. The polarizer usually used is obtained by dyeing polyvinyl alcohol with iodine or a dichroism pigment and then stretching the dyed polyvinyl alcohol, and this polarizer has a sufficiently high degree of polarization. For example, the contrast ratio of the polarizer itself (i.e., the value obtained by dividing the brightness created when one pair of polarizers are disposed for the respective axes of polarization to be parallel, by the brightness created when the polarizers are disposed for the axes of polarization to be orthogonal) usually amounts to at least 10,000:1.

The contrast ratios of the liquid-crystal display device which we view, however, are no more than about 1/10 of the above value. This is because a member that changes the polarized incident light into an undesirable polarized state or a partial depolarized state is present between the pair of polarizers, that is, inside the liquid-crystal panel. This change is caused by, for example, scattering due to cohesion of the fine particles of the pigment within the color filter layer, or by leakage light due to misalignment of the liquid crystal. It is mentioned in Non-Patent Document 1 that scattering from the liquid-crystal layer also causes the reduction in contrast. Of these events, scattering due to the color filter and the misalignment of the liquid crystal are well known. Various means for solving the problems are also reported. Regarding such scattering from the liquid-crystal layer, however, only scattering from a liquid-crystal layer of a bulk form is well known (source: Chandrasekhar, "Liquid Crystals", 2nd Ed., Cambridge University Press, 1992, Chap. 3, Sect. 9); no quantitative evaluations are reported on the influence occurring in an actual liquid-crystal display, that is, on what correlation the scattering caused by the liquid crystal layer disposed between orthogonal polarizers has with respect to leakage light, and on how the scattering event contributes to increasing the luminance in the black state.

An object of the invention disclosed in the present application, therefore, is to provide a liquid-crystal display device capable of reducing leakage of light under a black state due to scattering from a liquid-crystal layer, and having high-contrast, excellent image quality performance.

In order to achieve the above object, the present invention comprises: a liquid-crystal panel including a pair of substrates, a liquid-crystal layer held in sandwiched form between the pair of substrates, and a group of electrodes formed on at least a counterpart of the pair of substrates for applying an electric field to the liquid-crystal layer; a pair of polarizers disposed on a pair of substrates; and a light source unit disposed outside the pair of substrates; wherein the liquid-crystal layer held in sandwiched form between the pair of substrates is formed of a liquid-crystal material having an ordinary-light refractive index of at least 1.46, but up to 1.49, an extraordinary-light refractive index of at least 1.54, but up to 1.59, and a mean photoelastic constant of at least 8, but up to 25, and exhibiting a nematic phase.

In the present invention, it is possible to provide a liquid-crystal display device capable of reducing leakage of light under a black state, and having high-contrast, excellent image quality performance.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

Figure 1:
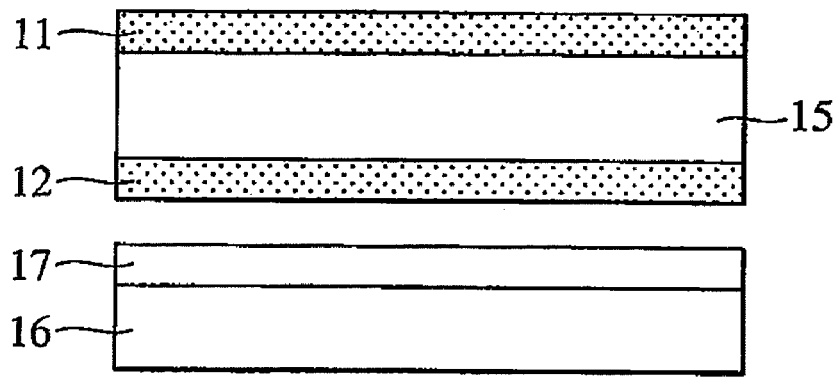
FIG. 1 is a schematic cross-sectional view showing an example of a liquid-crystal display device configuration according to the present invention.

The invention disclosed in the present application features comprising: a liquid-crystal panel including one pair of polarizers disposed on one pair of substrates, a liquid-crystal layer held in sandwiched form between the pair of substrates, and a group of electrodes formed on at least one of the pair of substrates and applying an electric field to the liquid-crystal layer; and a light source unit disposed outside the pair of substrates; wherein the liquid-crystal layer held in sandwiched form between the pair of substrates includes a liquid-crystal material having an ordinary-light refractive index of at least 1.46, but up to 1.49, an extraordinary-light refractive index of at least 1.54, but up to 1.59, and a mean photoelastic constant of at least 8, but up to 25, and exhibiting a nematic phase.

Hereunder, embodiments of a liquid-crystal display device according to the present invention will be described referring to the accompanying drawings. The invention, however, is not limited to the embodiments below.

First Embodiment

Physical properties of liquid-crystal materials A to C are listed in Table 1. Table 1 lists an extraordinary-light refractive index "$n_e$", an ordinary-light refractive index "$n_o$", birefringence $\Delta n$ that is a difference between the two refractive indices, a mean elastic constant $K=(K_{11}+K_{22}+K_{33})/3$, liquid-crystal layer thickness "d", and a scattering index $S_k$. The present inventors derived the scattering index $S_k$ from expression (1) used to calculate a size of a differential scattering cross-sectional area of the liquid-crystal layer. The scattering index $S_k$ shown in expression (2) indicates leakage light intensity of the liquid-crystal layer, and this index means the transmittance obtained with the liquid crystal layer disposed between orthogonal polarizers. The scattering index is in a direct proportional relationship with respect to both actual scattered-light intensity and leakage light of the liquid-crystal layer.

$$\frac{d\sigma}{d\Omega} \approx \left\{ \frac{\pi \cdot \Delta n(n_e + n_o)}{\lambda^2} \right\}^2 \frac{k_B T}{kq^2} \qquad \text{(Expression 1)}$$

where $K_B$ denotes a Boltzmann's constant, T an absolute temperature, and "q" a wave number vector, and "k" is defined by $k=k_{11} \approx K_{22} \approx k_{33}$.

$$I \propto S_{lc} = \frac{\{\Delta n(n_e + n_o)\}^2 \cdot d}{K} \qquad \text{(Expression 2)}$$

where $\Delta n$ denotes the birefringence of the liquid-crystal material, "$n_e$" the extraordinary-light refractive index, "$n_o$" the ordinary-light refractive index, "d" the thickness of the liquid-crystal layer, and K the mean value of the elastic constants of a splay $K_{11}$, a twist $K_{22}$, and a bend $K_{33}$.

TABLE 1

| Liquid Crystal | $n_e$ | $n_o$ | $\Delta n$ | $K \times 10^{12}$ N | $d \times 10^{-6}$ m | $S_{lc} \times 10^5$ m/N |
|---|---|---|---|---|---|---|
| A | 1.5888 | 1.4832 | 0.1056 | 11.9 | 3.79 | 0.334 |
|   |        |        |        |      | 7.73 | 0.682 |
|   |        |        |        |      | 15.15 | 1.34 |
|   |        |        |        |      | 29.17 | 2.57 |
| B | 1.5938 | 1.4934 | 0.1004 | 7.60 | 4.15 | 0.525 |
|   |        |        |        |      | 13.26 | 1.68 |
|   |        |        |        |      | 15.34 | 1.94 |
|   |        |        |        |      | 28.72 | 3.63 |
| C | 1.5451 | 1.4695 | 0.0756 | 11.2 | 4.11 | 0.191 |

Figure 2:
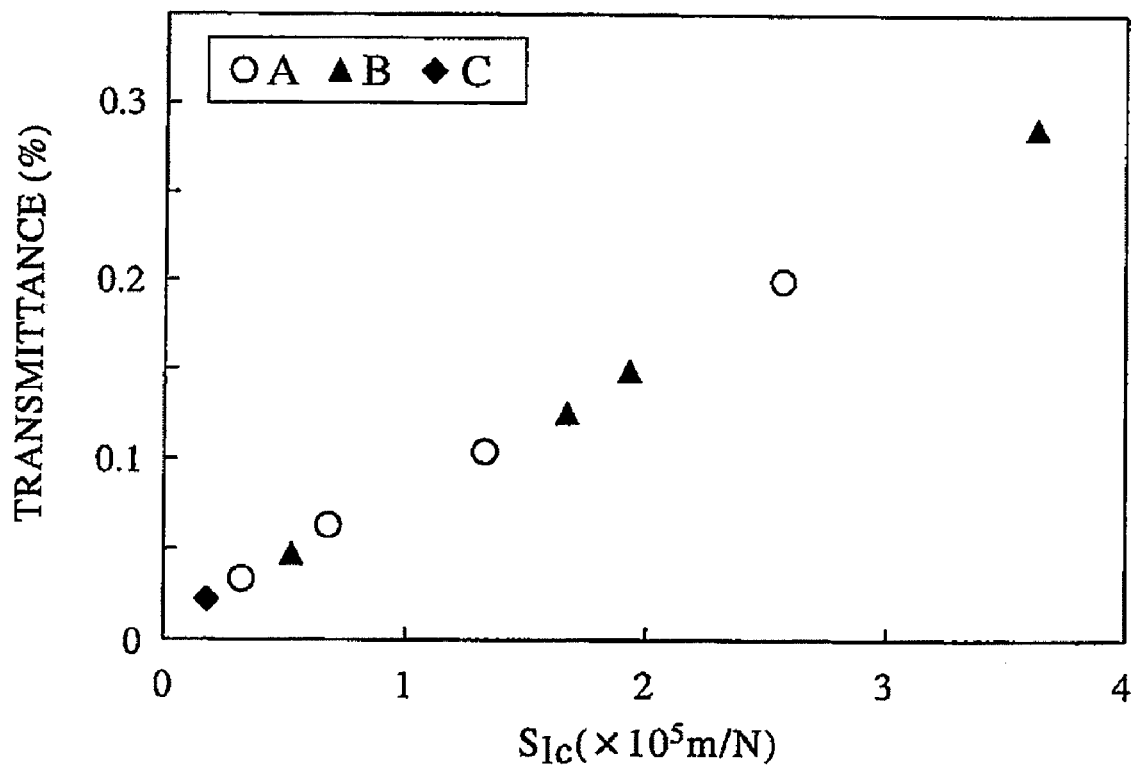
FIG. 2 shows an example of a correlation between a scattering index and leakage light from a liquid crystal in the present invention.
Figure 3:
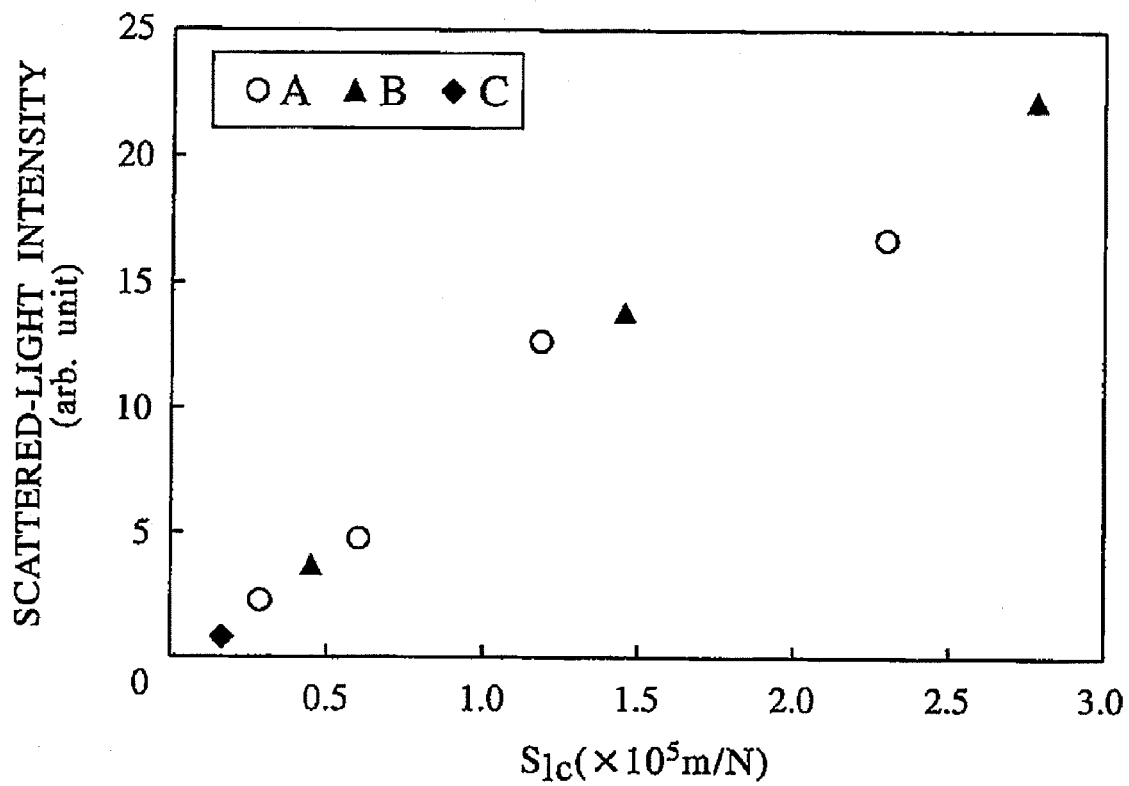
FIG. 3 shows an example of a correlation between the scattering index and scattered-light intensity of the liquid crystal in the present invention.
Figure 4:
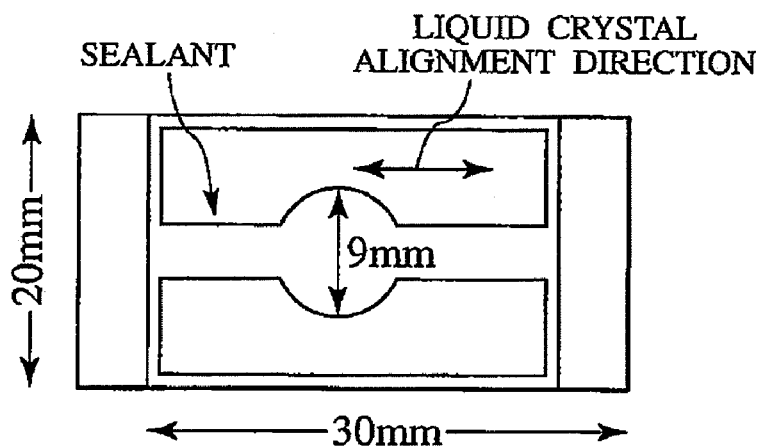
FIG. 4 is a schematic view of a unit cell used in an embodiment of the present invention.
Figure 5:
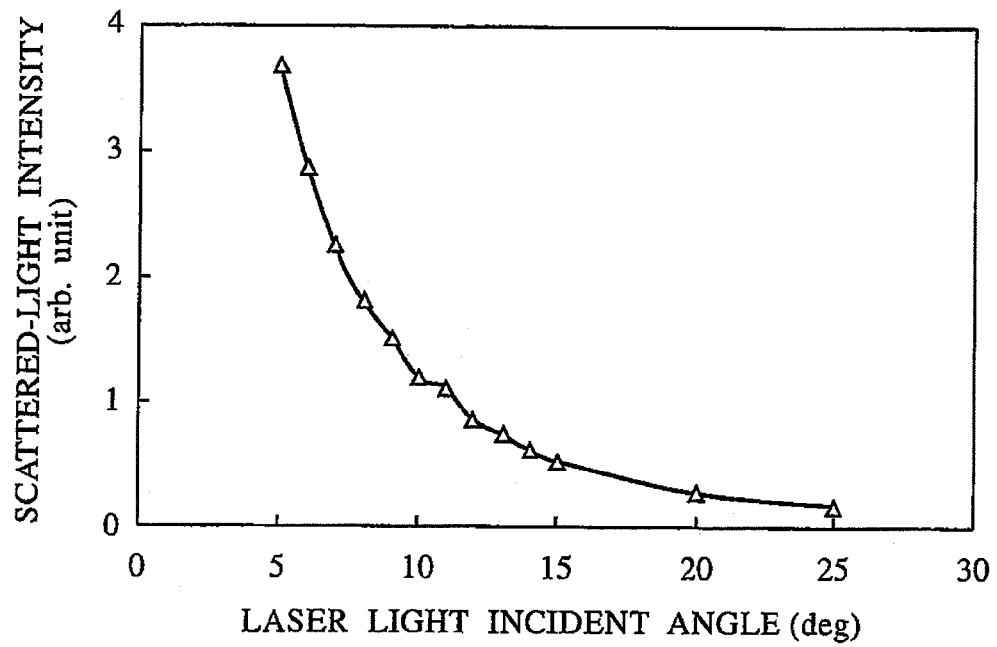
FIG. 5 is a diagram showing an example of measurement results on the scattered-light intensity of the liquid-crystal layer.

FIG. 2 represents the correlation between the scattering index SiC and leakage light, and FIG. 3 represents the correlation between the scattering index $S_{lc}$ and the scattered-light intensity. The liquid-crystal cell used in the present embodiment is a unit cell created by forming a polyimide alignment film on the surface of 0.7-mm thick non-alkali glass and after rubbing, sealing an edge of the alignment film with a sealant which contains spacer beads distributed for maintaining a required cell gap (liquid-crystal layer thickness). This unit cell is shown in FIG. 4. When the unit cell is illuminated at various incident angles from 5 to 25 degrees via a collimator lens and a condenser lens using a 651.5-nm semiconductor laser as a light source, the light exiting in a front (vertical direction) of the unit cell is measured as scattered light using a luminance meter. An example of measured data is shown in FIG. 5. As the angle of incidence becomes closer to a vertical angle, the light exiting frontward (i.e., the scattered light) increases in intensity. The value obtained by integrating scattered-light intensity levels associated with the incident angles of 5-25 degrees is the scattered-light intensity shown in FIG. 3.

The invention disclosed in this application assumes that in the liquid-crystal layer, the degree of polarization of the light entering obliquely at 30 to 70 degrees from the vertical direction is higher than the degree of polarization of the light entering from the vertical direction. More preferably, the degree of polarization of the light entering obliquely at 30 to 45 degrees is higher than the above latter degree of polarization.

Figure 6:
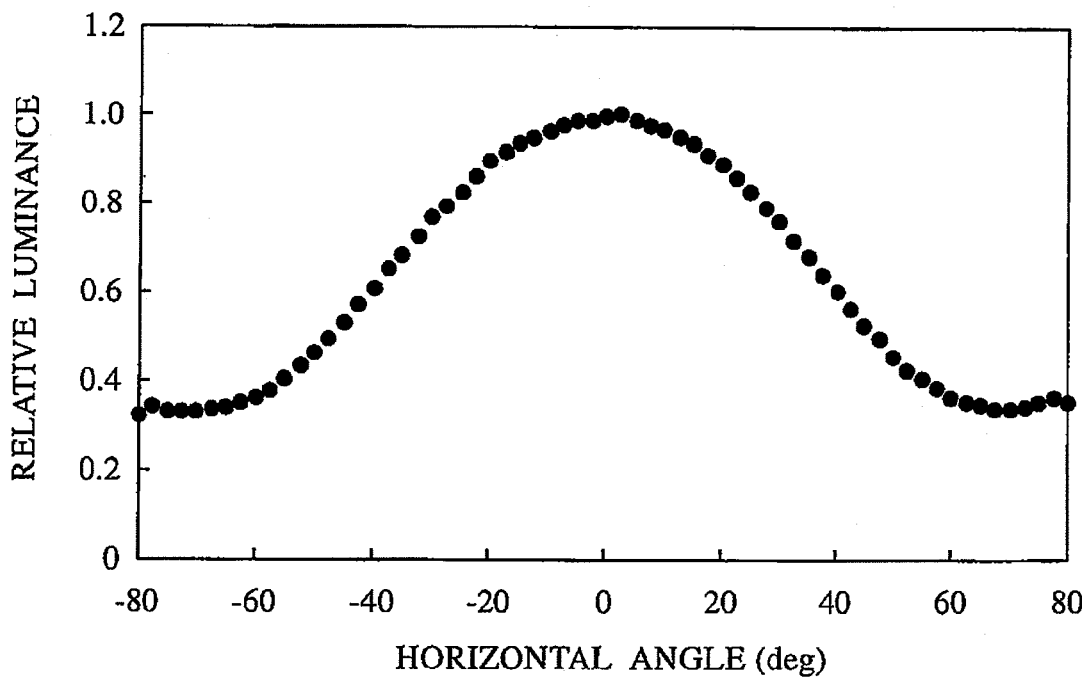
FIG. 6 is a diagram showing an example of horizontal viewing-angle characteristics of a backlight unit for luminous intensity of the light source in the present invention.

Meanwhile, the scattering of light due to thermal fluctuation of the liquid crystal in the liquid-crystal display device depolarizes the light, thus causing the light to leak, for the device uses a diffuse light source. This means that since the liquid-crystal display device is required to provide wide viewing characteristics angle, the light entering the liquid-crystal panel needs to be diffused to a certain degree. If the light emitted from a light source such as a fluorescent lamp or light-emitting diode is of a direct type, the light enters the liquid crystal as diffused light via a diffusing sheet or a condensing sheet. For a sidelight type of light source, an optical waveguide needs to be used, which also causes diffused light to enter the liquid-crystal panel. For example, light that enters the liquid-crystal layer has an angle distribution as shown in FIG. 6. Polarized light that enters the liquid-crystal layer from an oblique direction is scattered by thermal fluctuation of the liquid-crystal layer and exits frontward. The light exiting in a vertical direction is the light scattered by thermal fluctuation of the liquid-crystal layer, and is depolarized light. Therefore, light leaks under the black state of the liquid-crystal display.

For this reason, the backlight unit used in a second embodiment (described later herein) is used to measure the leakage light from the liquid-crystal layer. Orthogonal polarizers are disposed, then a unit cell set up in a rotational holder is disposed between the polarizers, and angle adjustments are conducted for minimum transmission of light. The value derived by dividing the then transmitted-light intensity by the luminance of the backlight unit is the transmittance, the value of which is shown in FIG. 2. During unit cell measurement on the backlight unit, heat from the backlight increases surface temperature of the unit cell to about 40 degrees. The refractive indices and the elastic constants change according to temperature. Table 1 lists data obtained at 40 degrees, and the scattering indices in FIG. 2 are based on the listed data. Since scattered-light measurement with a laser light source takes place at room temperature, the scattering indices in FIG. 3 are calculated using data obtained at 20 degrees. Characteristics change with temperature in this way, so implementing a liquid-crystal display device is to use the data obtained at an actual operating temperature. In general, decreases in temperature also reduce both the intensity of scattered light and the leakage of light. This is because, although the refractive indices also increase with the decreases in temperature, increase rates of the elastic constants are greater. In addition, while the liquid-crystal display devices of the present embodiment and the embodiments described later herein assume liquid-crystal layer surface temperatures of about 40 degrees, if temperature changes according to the kind of backlight unit used, the relationship with respect to the scattering index at the particular temperature can be effectively used. In the present invention, the refractive indices of the liquid crystal are based on 546 nm.

The retardation (also termed "birefringence"; expressed as "$d\Delta n$") that is a product of the refractive anisotropy (the difference between extraordinary-light refractive index and ordinary-light refractive index; expressed as "$\Delta n$") and the thickness (expressed as "d") of the liquid-crystal layer is an important factor that determines the white-state characteristics of the liquid-crystal display device of the normally closed mode. It is therefore important to assign the data that allows for the white-state characteristics. To this end, the retardation is preferably from 0.32 or more, but up to 0.40.

It can be seen from the above that an optimum luminance value and a high contrast ratio can be obtained in both the black state and the white state by using a nematic liquid-crystal material that has an ordinary-light refractive index of 1.46 or more, but up to 1.49, an extraordinary-light refractive index of 1.54 or more, but up to 1.59, and a mean elastic constant K of at least 8.

The refractive indices indicate the optical properties of the liquid-crystal material, and the mean elastic constant K that is the mean value of the elastic constants of the splay $K_{11}$, the twist $K_{22}$, and the bend $K_{33}$, indicates a mechanical property of the material.

In other words, while it is important to reduce the refractive indices and increase the elastic constants, absolute values of the extraordinary-light and ordinary-light refractive indices are preferably reduced since refractive anisotropy is determined from the white-state characteristics, as discussed above. The elastic constants are preferably greater, more preferably, at least 9, and further preferably, at least 10. An upper limit theoretically equals that of the material exhibiting the liquid-crystal phase, but from a practical point of view, is up to the elastic constant of the bend $K_{33}$ (this value is the greatest value in a large majority of materials), that is, up to 25. More preferably, the upper limit is up to 20.

The leakage of light under the black state of the liquid-crystal display device employing the normally closed mode can be drastically reduced by using such a liquid-crystal material. Therefore, the present invention reduces the luminance in the black state, creates sufficient luminance in the white state, and yields a high contrast ratio in the liquid-crystal display device.

Second Embodiment

Hereunder, embodiments of the present invention will be described referring to the accompanying drawings.

Figure 7:
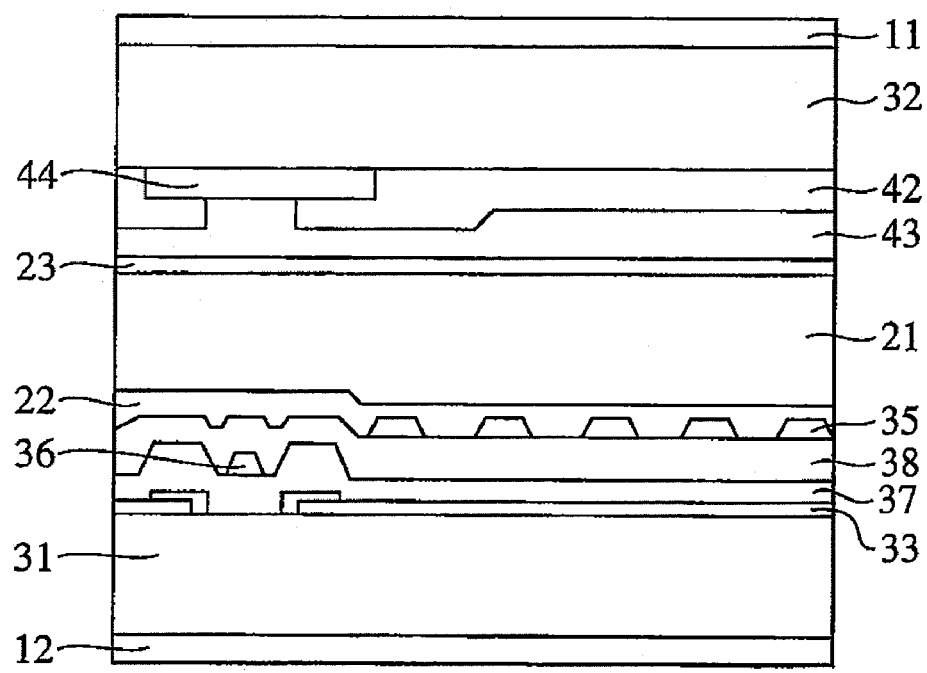
FIG. 7 is a schematic cross-sectional view of a peripheral region of one pixel, explaining another embodiment of a liquid-crystal display device according to the present invention.
Figure 8:
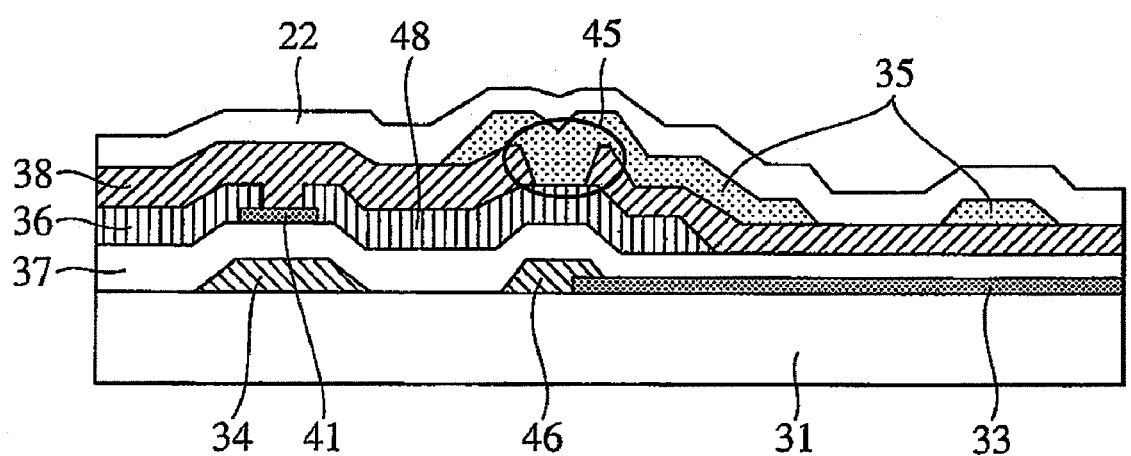
FIG. 8 is a schematic cross-sectional view of a peripheral region of one pixel, explaining the embodiment of the liquid-crystal display device according to the present invention.
Figure 9:
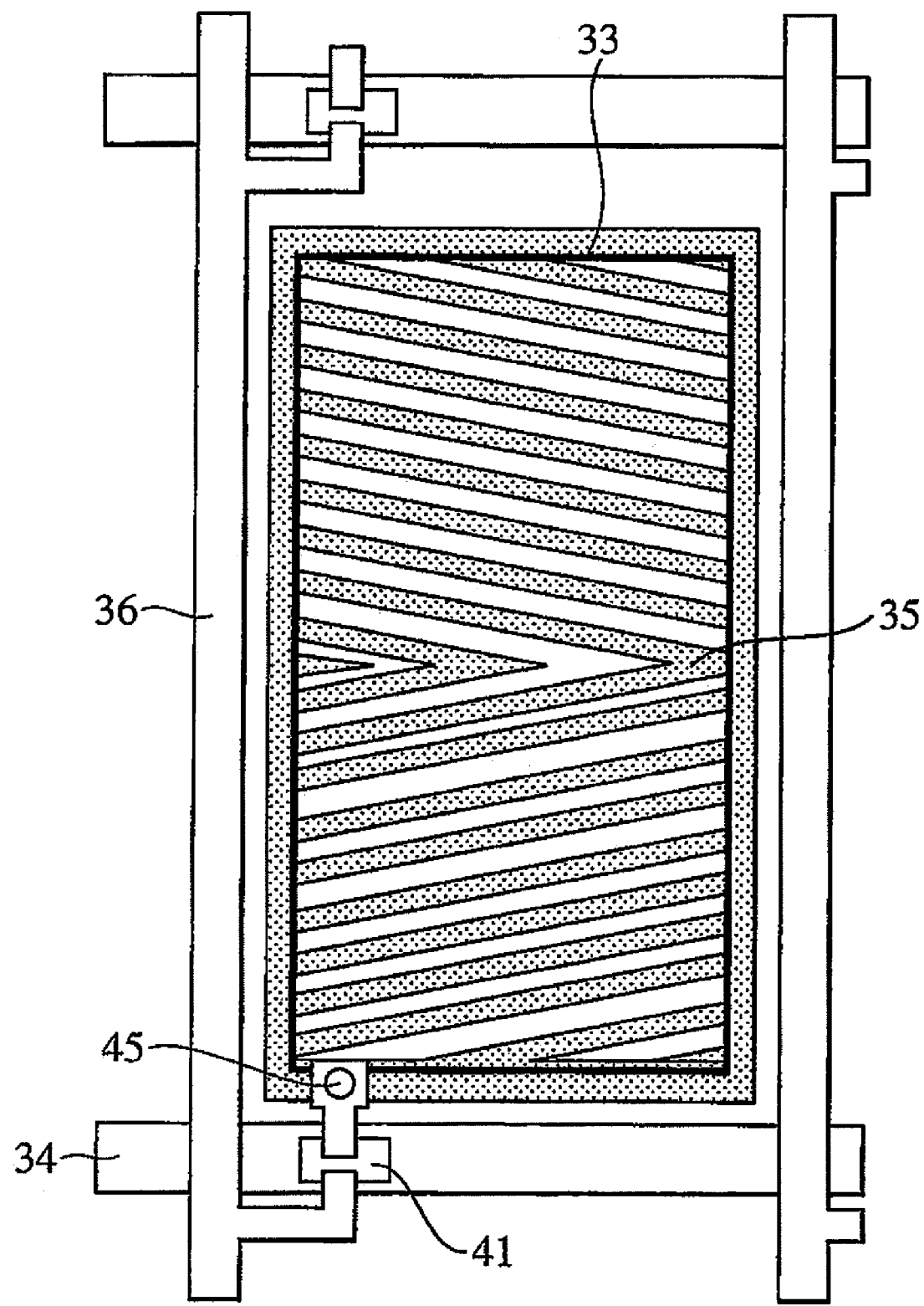
FIG. 9 is a schematic view of a peripheral region of one pixel on an active-matrix substrate, explaining the embodiment of the liquid-crystal display device according to the present invention.
Figure 10:
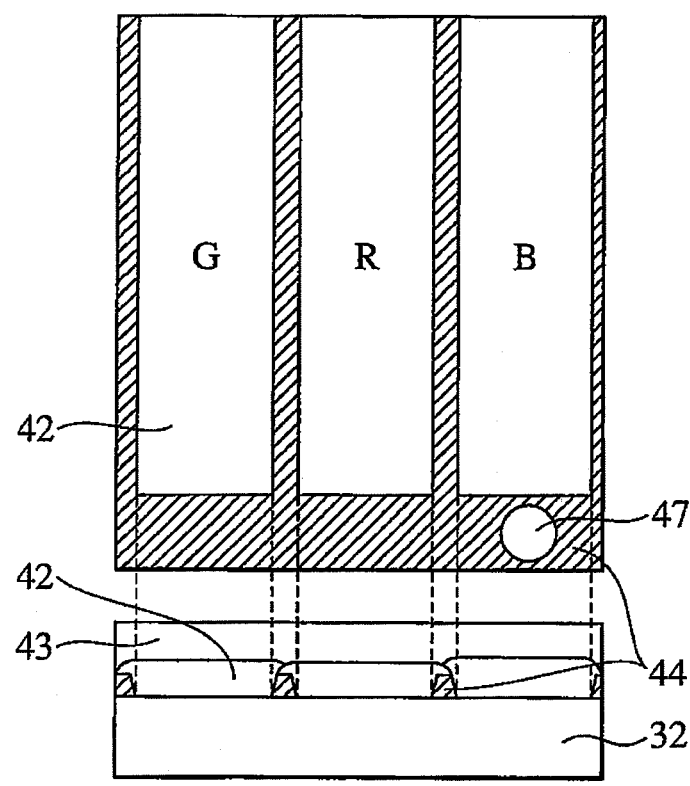
FIG. 10 is a schematic view of a peripheral region of one picture element on a color filter substrate, explaining the embodiment of the liquid-crystal display device according to the present invention.

Manufacture of a liquid-crystal display device that is a first embodiment of the present invention is described below referring to FIGS. 1 and 7 to 10. FIG. 1 is a schematic cross-sectional view for explaining an embodiment of the liquid-crystal display device according to the present invention. FIGS. 7 and 8 are schematic cross-sectional views of a peripheral region of one pixel, explaining the embodiment of the liquid-crystal display device according to the present invention. FIG. 9 is a schematic view of a peripheral region of one pixel on an active-matrix substrate, explaining the embodiment of the liquid-crystal display device according to the present invention. FIG. 10 is a schematic view of a peripheral region of one picture element on a color filter substrate (in the present embodiment, an R/G/B tri-color pixel pattern).

As shown in FIG. 1, the liquid-crystal display device of the present invention comprises: a liquid-crystal panel 15 including on one pair of substrates (31 and 32), a liquid-crystal layer 21 held in sandwiched form between the pair of substrates, and a group of electrodes formed on at least one of the pair of substrates and applying an electric field to the liquid-crystal layer 21; one pair of polarizers (11 and 12) for holding the liquid-crystal panel 15 in sandwiched form; and a light source unit 16 with an optical sheet 17 and a light source.

As shown in FIGS. 7 to 9, a common electrode 33 formed of an indium-tin-oxide (ITO) is disposed on the substrate 31 as an active-matrix substrate. Also, a scan electrode (gate electrode) 34 formed of molybdenum/aluminum (Mo/Al), and a common electrode line (common line) 46 are formed to overlap the ITO common electrode, and a gate insulator 37 formed of silicon nitride is formed to shroud the common electrode 33, the gate electrode 34, and the common electrode line 46. In addition, a semiconductor film 41 formed of amorphous silicon or polysilicon is disposed above the scan electrode 34 via the gate insulator 37, and the semiconductor film 41, as an active element, functions as an active layer of a thin-film transistor (TFT). Furthermore, a signal electrode (drain electrode) 36 formed of chromium/molybdenum (Cr/Mo), and a pixel electrode (source electrode) line 48 are disposed so as to be superimposed upon part of a pattern of the semiconductor film 41, and a passivation insulator 38 formed of silicon nitride is formed to shroud all of the elements 36, 48, and 41.

Furthermore, as shown in FIG. 7, one pair of alignment films (22 and 23) is disposed to hold the liquid-crystal layer 21 in sandwiched form. On the substrate 32 located at a side opposite to the substrate 31 which is the active-matrix substrate, a color filter layer 42 is formed, upon which film an overcoat layer 43 is further formed. Moreover, a black matrix 44 is formed between pixels.

Besides, as shown in FIG. 8, an ITO pixel electrode (source electrode) 35 connecting to the pixel electrode (source electrode) line 48 of the metal (Cr/Mo) via a through-hole 45 formed via the passivation insulator 38 is disposed thereon.

Additionally, as can be seen from FIG. 9, in planar perspective, the ITO common electrode (common electrode) 33 is formed into a planar disc shape in a region of one pixel and the ITO pixel electrode (source electrode) 35 is formed into an interdigital shape inclined at about 8 degrees. Thus, the active-matrix substrate implements a screen size of 32 inches (diagonally) and has sufficient pixels to achieve WXGA resolution.

Next, as shown in FIG. 10, the black matrix 44 is formed on the substrate 32 through coating, pre-baking, light exposure, development, rinsing, and post-baking steps, by means of a black resist (manufactured by Tokyo Ohkakogyo Co., Ltd.) and photolithography that is a regular method. While the present embodiment assumes a film thickness of 1.5 μm, actual film thickness can be adjusted to suit the particular black resist so that the optical density obtained will be roughly 3 or more. The above is followed by forming the color filter layer 42 through coating, pre-baking, light exposure, development, rinsing, and post-baking steps, by means of photolithography and a tri-color black resist. While the present embodiment assumes film thicknesses of 3.0 μm for blue, 2.8 μm for green, and 2.7 μm for red, actual film thicknesses can be adjusted to desired color purity or the liquid-crystal layer thickness as appropriate. Although the black matrix 44 in the present embodiment is formed so as to surround one pixel, the black matrix 44 can be formed so as to encompass a region of the scan electrode 34 on the TFT substrate, so as not to encompass a region in which different colors overlap, and so as to be adjacent to and encompass a region in which resist elements of different colors overlap. Alternatively, a color filter created using a method generally called the ink-jet scheme can be used.

Next, the overcoat layer 43 is formed using the V-259, a product by the Nippon Steel Chemical Co., Ltd., to planarize the surface and to protect the color filter layer. During exposure, illumination with a luminous quantity of 200 mJ/cm$^2$ is conducted using i-rays of a high-pressure mercury lamp, followed by 200° C. 30-minute heating. The film thickness ranges from about 1.2 to 1.5 μm on pixels. If sufficient preventive measures against contamination from the color filter layer are provided, the overcoat layer may not need to be formed. Next, a column spacer 47 is formed to be about 3.9 μm high above the black matrix interposed between blue pixels, by means of a photosensitive resin, photolithography, and etching. The column spacer can be formed at any position according to particular requirements, and a position of the spacer is not limited to or by the present embodiment. Alternatively, a spherical ball spacer may be selectively disposed using a method such as printing or the ink-jet scheme.

Polyamic acid varnish is formed on both the TFT substrate and the color filter substrate by printing, and then 210° C. 30-minute heating is conducted. This is followed by formation of fine polyimide films, as the alignment films 22, 23, with a thickness of about 100 nm, and further followed by rubbing. The alignment film material in the present embodiment is not limited in any terms and may be, for example, either a polyimide that uses 2,2-bis[4-(p-aminophenoxy)phenylpropane] as diamine, and 1,2,4,5-benzenetetracarboxylic acid anhydride as an acid anhydride component, or a polyimide that uses p-phenylene diamine, diaminodiphenylmethane, or the like as an amino component, and aliphatic tetracarboxylic dianhydride or dianhydride-containing benzene-1,2,4,5-tetracarboxylic acid as an acid anhydride component. Although the present embodiment uses a rubbing method, the method of forming the alignment films is not limited to rubbing and the alignment films may be formed, for example, by polarized ultraviolet irradiation using an optically functional alignment film material, or by an ion beam method that uses diamond-like carbon. The liquid crystal is aligned in a direction of the scan electrode 34 shown in FIG. 9, that is, a horizontal direction of the drawing.

In addition, the liquid-crystal layer is disposed so that an alignment direction exhibited thereby will be essentially parallel to a polarization axis of the polarizer of the paired polarizers that is disposed at the light source side.

Next, the surfaces of the alignment films 22, 23 having a liquid-crystal aligning capability are opposed to each other on the two substrates, then peripheries of the alignment films are coated with a sealant, and the liquid-crystal panel is assembled.

A nematic liquid-crystal composition that features +3.4 (at 1 kHz and 25° C.) in dielectric anisotropy, 1.5875 in extraordinary-light refractive index, 1.4873 in ordinary-light refractive index, 0.1002 (at a 546-nm wavelength and 25° C.) in birefringence, 16.4 in $K_{11}$, 8.7 in $K_{22}$, 21.3 in $K_{33}$, and 15.5 (at 25° C.) in mean elastic constant, is charged into the panel.

The polarizers 11, 12 are affixed to the outside of the liquid-crystal panel substrate so as to be orthogonal. Use of a viewing-angle compensation film at this time improves the contrast in the viewing-angle direction. In the present invention, since front contrast can be improved, the use of the viewing-angle compensation film also improves the contrast in the viewing-angle direction and further improves image quality of the display.

A liquid-crystal module is constructed by connecting a driving circuit, a light source unit, and other elements, to obtain the liquid-crystal display device. The light source unit is of a direct type with 12 three-wavelength fluorescent tubes as a light source, having three diffuser plates and diffuser sheets on the light source. The configuration of the light source unit is not limited to the present embodiment. The diffuser sheets may be replaced by condenser sheets or by light-utilizing efficiency improving sheets that use a polarized-light conversion layer. In addition, the fluorescent-tubes used as the light source may be either hot-cathode tubes or cold-cathode tubes. Alternatively, the light source can be of a light-emitting diode type, an organic electroluminescent (EL) type, or other types. An optical waveguide can be used for a sidelight type, not the direct type.

A panel contrast ratio of the liquid-crystal display device in the present embodiment is 1530:1. The panel contrast ratio is defined as a characteristic contrast ratio of the panel, the characteristic contrast ratio being defined from minimum and maximum luminance levels obtained at a fixed intensity level of the light source when no backlight (BL) dimming is provided. Two methods are available to measure the panel contrast ratio. One method is by, for example, creating a display at full-screen maximum and minimum luminance levels with the fixed intensity of the light source, and dividing the maximum luminance by the minimum luminance. The other method is by, for example, displaying a window of a maximum grayscale level (maximum luminance) on part of a screen with minimum luminance (minimum grayscale level) assigned to a background screen, and dividing the maximum luminance by the minimum luminance of the background. If an image-processing engine is operated to perform gamma-corrections according to the particular display luminance of the screen, contrast can be evaluated using full-screen display, that is, the former of the above two measuring methods. Either of the measuring methods can be used unless the above image-processing engine is operated. The latter of the above two measuring methods is used to evaluate practical contrast that allows for image-processing engines. Hereinafter, the contrast ratio measured using the former method is defined as the panel contrast ratio, the contrast ratio measured using the latter method is defined as a dynamic gamma-contrast ratio, and the contrast ratio obtained during contrast measuring when the window is displayed (i.e., the contrast measured during display of the same screen when all other image-processing engines, inclusive of BL dimming, are operated) is defined as a practical contrast ratio.

In order to conduct comparisons in image quality, the present inventors arranged the panel of the present embodiment and a panel of a first comparative example (described later herein), and held a DVD movie-watching session attended by 57 viewers. As a result, 54 persons answered that the images created by the panel of the present embodiment were obviously clearer. The remaining 3 persons answered that they were unable to find any differences. Of the 57 viewers, 23 persons were display developers and 34 persons were not display developers. Ages ranged from 25 to 62 years old, with a maximum distribution being from 35 to 45 years of age.

FIRST COMPARATIVE EXAMPLE

The panel that was created as the first comparative example differs from that of the first embodiment, only in the kind of liquid-crystal material. A nematic liquid-crystal composition that features +4.3 (at 1 kHz and 25° C.) in dielectric anisotropy, 1.5938 in extraordinary-light refractive index, 1.4934 in ordinary-light refractive index, 0.100 (at a 546-nm wavelength and 25° C.) in birefringence, and 7.8 (at 25° C.) in mean elastic constant, was charged into the liquid-crystal material B of the present comparative example. The panel contrast ratio in the present comparative example was 870:1.

Third Embodiment

Liquid-crystal panels similar to the panel of the first embodiment were created using liquid-crystal materials C to J. Physical properties of the liquid-crystal panels, thicknesses of the liquid-crystal layers, $S_k$ defined in expression (1), and panel contrast (CR) ratios are listed in Table 2.

TABLE 2

| | Liquid Crystal | $n_e$ | $n_o$ | Δn | K (×$10^{12}$ N) | d (×$10^{-6}$ m) | $S_{lc}$ (×$10^4$) | Panel CR |
|---|---|---|---|---|---|---|---|---|
| First Embodiment | A | 1.5875 | 1.4873 | 0.1002 | 15.5 | 3.75 | 2.297 | 1530 |
| Comparative Example 1 | B | 1.6057 | 1.4963 | 0.1004 | 9.3 | 3.75 | 4.644 | 870 |
| Second Embodiment | C | 1.5880 | 1.4880 | 0.1000 | 11.6 | 3.81 | 3.108 | 1200 |
| | D | 1.5960 | 1.4930 | 0.1030 | 11.2 | 3.90 | 3.525 | 1090 |
| | E | 1.5921 | 1.4932 | 0.0989 | 10.1 | 3.90 | 3.595 | 1050 |

TABLE 2-continued

| Liquid Crystal | $n_e$ | $n_o$ | $\Delta n$ | K ($\times 10^{12}$ N) | d ($\times 10^{-6}$ m) | $S_{lc}$ ($\times 10^4$) | Panel CR |
|---|---|---|---|---|---|---|---|
| F | 1.5979 | 1.4879 | 0.1100 | 13.5 | 3.79 | 3.235 | 1130 |
| G | 1.5880 | 1.4890 | 0.0990 | 11.7 | 3.90 | 3.101 | 1220 |
| H | 1.5913 | 1.4918 | 0.0995 | 9.4 | 3.75 | 3.754 | 1030 |
| I | 1.5971 | 1.4970 | 0.0989 | 9.4 | 3.77 | 3.847 | 1010 |
| J | 1.5825 | 1.4871 | 0.0954 | 10.9 | 3.77 | 2.966 | 1320 |

Figure 11:
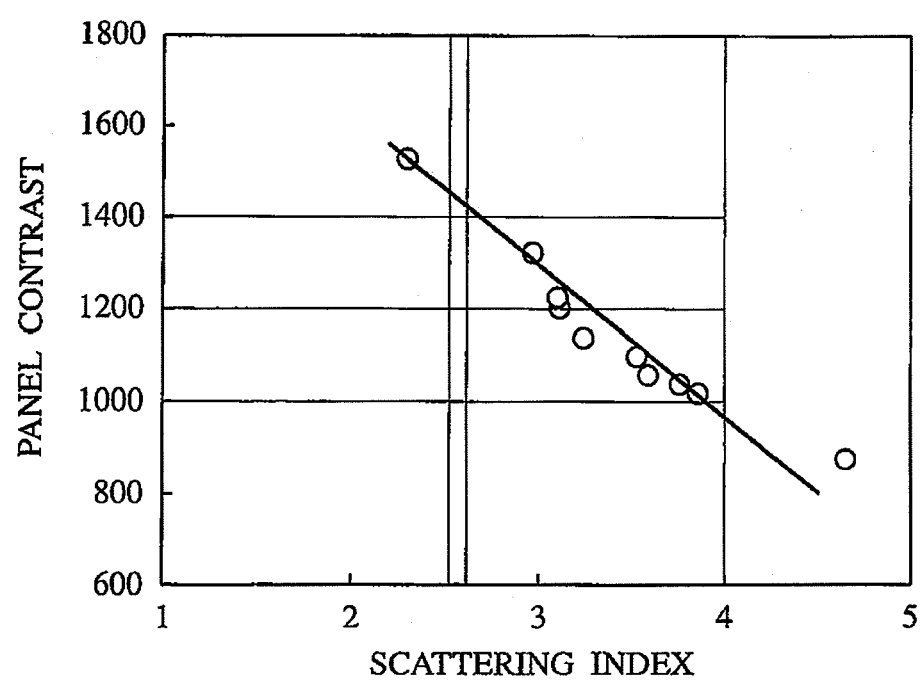
FIG. 11 shows an example of a correlation between the scattering index and panel contrast ratio in the present invention.

The correlation between the scattering index $S_k$ and the panel contrast ratio is shown in FIG. 11. It is obvious that as shown in FIG. 11, a favorable correlation is established between the scattering index $S_k$ and the panel contrast ratio. This correlation holds under conditions not causing a significant difference in retardation (product of $\Delta n$ of the liquid crystal and the thickness of the liquid-crystal layer). For an actual liquid-crystal panel, the retardation value is a factor that governs the luminance in the white state or the maximum luminance, and if the retardation value stays within its setting range defined for a practical liquid-crystal panel, the above correlation can be obtained without a problem.

It can be seen from the above correlation that if the scattering index is equal to or less than 4 ($\times 10^4$ m/N), the panel contrast ratio is equal to or more than 1000:1. Similarly, if the scattering index is equal to or less than 3.2 ($10^4$ m/N), a panel contrast ratio equal to or more than 1200:1 can be obtained, and if the scattering index is equal to or less than 2.5 ($\times 10^4$ m/N), a panel contrast ratio equal to or more than 1400:1 can be obtained.

At this time, the degree of depolarization of the color filter/electrode substrate section that is a scattering medium other than the liquid crystal in the liquid-crystal panel, or the degree of polarization of the polarizers causes the correlation between the scattering index and the panel contrast ratio to translate in parallel. Polarizers whose degree of polarization is 0.99967, and a color filter whose degree of depolarization ranges from 1.5 to $1.8 \times 10^{-4}$ are used in the present embodiment. If these members significantly fluctuate in the degree of polarization or the degree of depolarization, there is a need to obtain a correlation different from the above. Realistically, however, the color filter and the electrode substrate are improved to provide a lower degree of depolarization, and the polarizers are improved to offer a higher degree of polarization in the liquid crystal panel for which higher contrast is requested. Therefore, since there is a tendency for the above scattering index to be improved so that, for example, if the current panel contrast ratio of the panel is 1200:1, this value is increased to 1300:1 for a scattering index of 3.2 ($\times 10^4$ m/N), the correlation can be determined using this index.

The degree of polarization (P) of the polarizers in the present embodiment was defined per expression (3) by using a backlight unit as the light source, and measuring the luminance levels obtained when the pair of polarizers were arranged in cross form ($L_{90}$) and in parallel form ($L_0$).

$$P = \sqrt{\frac{L_0 - L_{90}}{L_0 + L_{90}}} \quad \text{(Expression 3)}$$

The degree of depolarization (d) of the color filter was defined per expression (4) by using a backlight unit as the light source, and measuring the luminance levels obtained when the pair of polarizers were arranged in cross ($L_{90}'$) and parallel ($L_0'$) forms with the color filter substrate disposed between the polarizers.

$$d = 1 - \frac{L_0' + L_{90}'}{P'^2(L_0' + L_{90}')} \quad \text{(Expression 4)}$$

where P' denotes the degree of polarization of the polarizers that allowed for spectral characteristics of the color filter.

Figure 12:
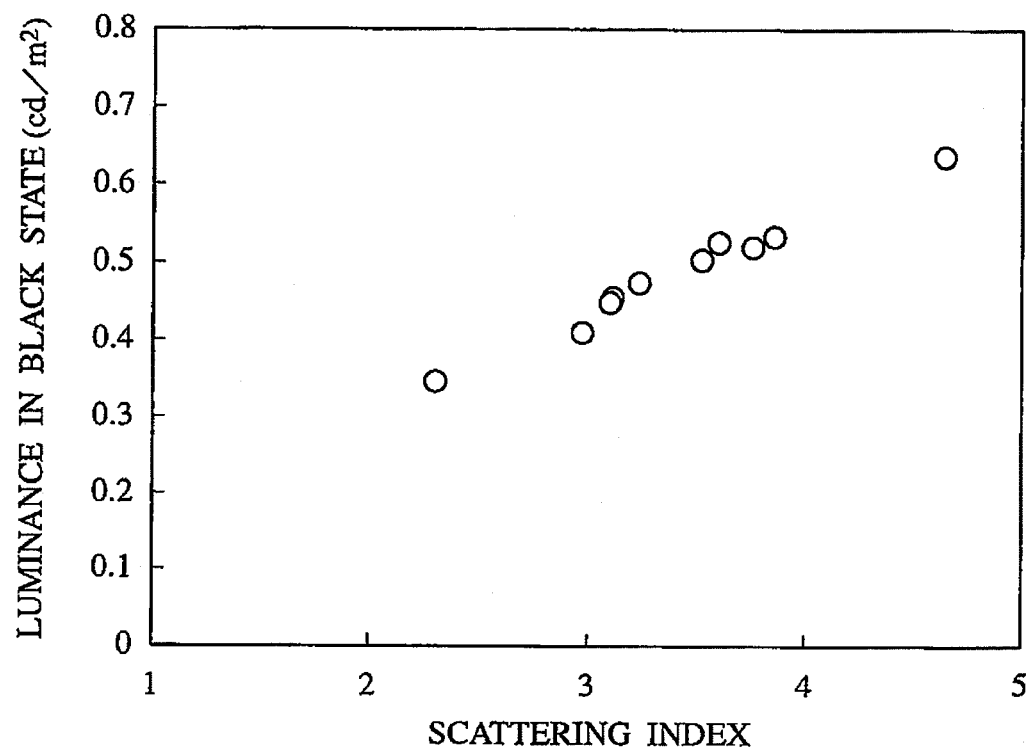
FIG. 12 shows an example of a correlation between the scattering index and luminance in a black state of the present invention.

FIG. 12 shows the correlation between the luminance in the black state and the scattering index. Since the above-described influence of the white state can be eliminated, the correlation in FIG. 12 denotes leakage levels of light in black state according to scattered-light intensity, and FIG. 12 represents a very favorable correlation. That is to say, the curve shown in FIG. 12 can be shifted downward by reducing the color filter, the electrode substrate, and/or other members, in the degree of depolarization, or by improving the polarizers in the degree of polarization.

The following discusses sensory test results that were obtained from seven subjects (viewers):

During the tests, the present inventors got the seven subjects to watch a TV broadcast that accounted for 87% of all images ranging from 5% to 40% in average luminance level (ALL), and a movie that accounted for 95% of all images ranging from 4% to 40% in average luminance level (ALL). The subjects were given a three-minute rest each time they watched for five minutes in each test session. They watched the TV broadcast first and then after a ten-minute rest, watched the movie. An order in which to change image quality in presenting the TV broadcast and the movie broadcast was changed without the subjects being let to know which type of display was to be presented. The tests were conducted in a room conditioned to obtain a vertical illuminance of about 100 luces, and indirect illumination was used to prevent light from being projected onto the display screen.

The sensory tests were conducted using four display units: liquid-crystal materials A (first embodiment), B (first comparative example), C (third embodiment), and I (third embodiment).

Each display unit is hereinafter identified by the symbol denoting the kind of liquid-crystal material.

Immediately after presenting the five-minute display, the present inventors got the subjects to evaluate image quality using the following five levels, with a lower permissible limit of 3.5 and a tolerable limit of 2.

5: The image is very clear.
4: There is something to be desired in several places, but roughly, the image is clear.
3: The image has almost nothing that gives a sense of clearness, but is not of such a level as to give dissatisfaction.
2: The image gives dissatisfaction in several places.
1: The image gives strong dissatisfaction.

Test results are listed in Table 3. Numerals listed in the table are average evaluations of the seven subjects.

TABLE 3

| Sub-ject | A TV | A Movie | B TV | B Movie | C TV | C Movie | I TV | I Movie |
|---|---|---|---|---|---|---|---|---|
| a | 5 | 5 | 4 | 1 | 5 | 3 | 4 | 2 |
| b | 4 | 4 | 3 | 1 | 4 | 2 | 4 | 1 |
| c | 5 | 5 | 4 | 2 | 5 | 4 | 5 | 3 |
| d | 4 | 3 | 2 | 1 | 4 | 2 | 3 | 1 |
| e | 5 | 5 | 4 | 2 | 4 | 3 | 4 | 2 |
| f | 5 | 5 | 4 | 2 | 5 | 3 | 4 | 3 |
| g | 5 | 4 | 3 | 1 | 4 | 3 | 3 | 2 |
| Average | 4.7 | 4.4 | 3.4 | 1.4 | 4.4 | 2.9 | 3.9 | 2.0 |
| σ | 0.49 | 0.79 | 0.79 | 0.53 | 0.53 | 0.69 | 0.69 | 0.82 |

In the TV broadcast, the displays other than B in the comparative example cleared the lower permissible limit. In the movie broadcast, display A was at a level of the lower permissible limit, displays C and H were at a level of the tolerable limit, and display B was below the tolerable limit. For B, it can be seen that although the image quality of the comparative example B is of a level tolerable for watching TV broadcasts only, the image quality is of a level intolerable for watching movie (DVD) broadcasts. Enjoying movie broadcasts in one's living room might not be an everyday affair of life, but probably takes place on weekends. It can be seen from these, therefore, that the panel contrast ratio needs to be at least 1000:1.

To achieve the panel contrast ratio of 1000:1, the scattering index $S_k$ needs to be 3.85 or less. To this end, the liquid-crystal material must not exceed 1.6 in extraordinary-light refractive index and must be 9.4 or more in mean elastic constant. As discussed above, the retardation (the product of birefringence and the thickness of the liquid-crystal layer) is not changed from the characteristics of the display in the white state, so not all of the physical characteristics values relating to the scattering index can be determined arbitrarily. For these reasons, values of the liquid-crystal material as critical values of its extraordinary-light refractive index and its mean elastic constant, are determined.

It can be seen from Table 2 that a more preferable panel contrast ratio is 1200:1. In other words, it can be read from Table 2 that for the movie broadcast, display I (1010:1 in panel contrast ratio) clears the tolerable limit on the average, but in consideration of a standard deviation, the tolerable limit cannot be cleared with this display, that is, persons who feel dissatisfied are present at a high rate. It can also be seen from Table 2 that at panel contrast ratios of 1200:1 or more, the displays clear the tolerable limit at a high rate, and thus that an even more preferable panel contrast ratio is 1200:1 or more. To achieve the panel contrast ratio of 1200:1, the scattering index $S_k$ needs to be 3.11 or less. To this end, the liquid-crystal material must not exceed 1.59 in extraordinary-light refractive index or 1.49 in ordinary-light refractive index, and must be 11.5 or more in mean elastic constant. As discussed above, the retardation (the product of birefringence and the thickness of the liquid-crystal layer) is not changed from the characteristics of the display in the white state, so not all of the physical characteristics values relating to the scattering index can be determined arbitrarily. For these reasons, the values of the liquid-crystal material as the critical values of its extraordinary-light refractive index, its ordinary-light refractive index, and its mean elastic constant, are determined.

A further preferable panel contrast ratio is 1500:1 or more, for the lower permissible limit can be cleared in all aspects. To achieve the panel contrast ratio of 1500:1, the scattering index $S_k$ needs to be 2.3 or less. To this end, the liquid-crystal material must not exceed 1.59 in extraordinary-light refractive index or 1.49 in ordinary-light refractive index, and must be 15 or more in mean elastic constant. As discussed above, the retardation (the product of birefringence and the thickness of the liquid-crystal layer) is not changed from the characteristics of the display in the white state, so not all of the physical characteristics values relating to the scattering index can be determined arbitrarily. For these reasons, the values of the liquid-crystal material as the critical values of its extraordinary-light refractive index, its ordinary-light refractive index, and its mean elastic constant, are determined.

Figure 13:
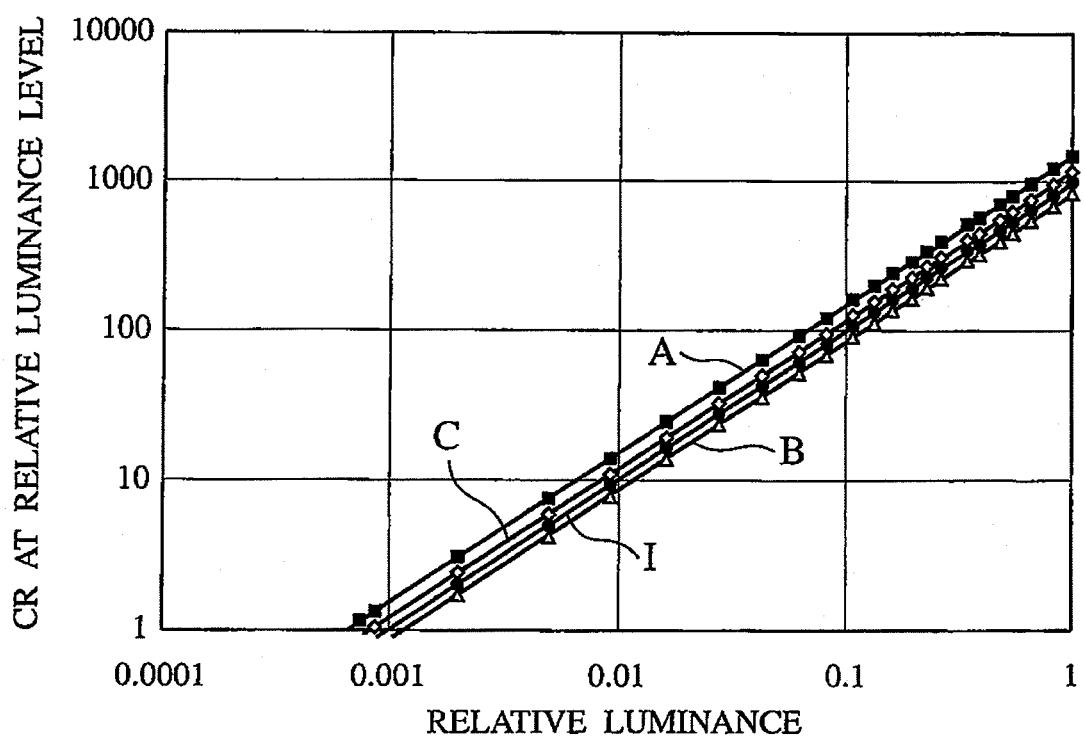
FIG. 13 is a diagram that shows grayscale contrast characteristics with respect to the panel contrast ratio of the liquid-crystal display device according to the present invention.

Effectiveness of the present invention can also be accounted for in-a perspective of image quality evaluation. FIG. 13 is a diagram in which the luminance at each grayscale level is plotted on a horizontal axis as relative luminance with respect to a luminance level of 1 in the white state, and grayscale contrast that is a ratio between the relative luminance and the luminance in the black state is plotted on a vertical axis. Also, ■ denotes display A whose panel contrast ratio is 1530:1, □ denotes display C whose panel contrast ratio is 1200:1, ● denotes display I whose panel contrast ratio is 1010:1, and Δ denotes display B (comparative example) whose panel contrast ratio is 870:1.

Figure 14:
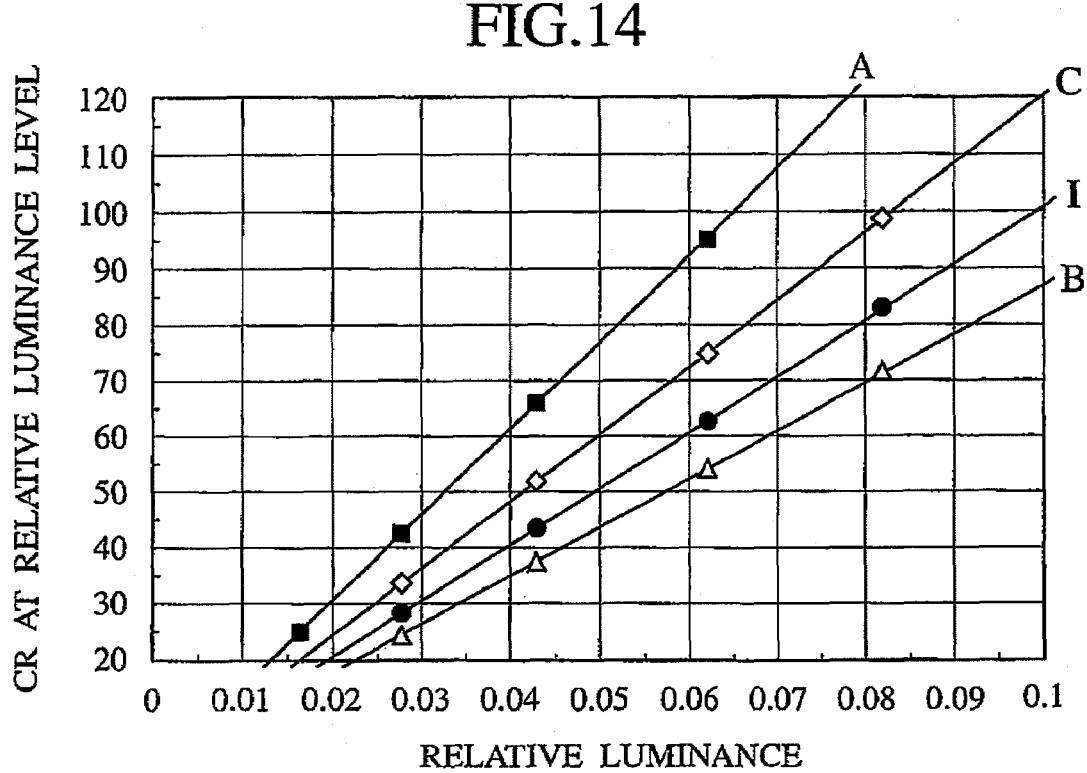
FIG. 14 is a diagram that shows vicinity of low-grayscale-level contrast characteristics with respect to the panel contrast ratio of the liquid-crystal display device according to the present invention.

To maintain a high contrast ratio for the luminance of a low grayscale level, the panel contrast represented as the ratio of the luminance levels in the black and white states needs to be raised sufficiently. For the TV broadcast, the values of ALL from 5% (0.05 in relative luminance) to 40% (0.4 in relative luminance) account for 87% of all data. Since sufficient contrast can be constantly retained at high grayscale levels, low grayscale levels strongly affect image quality evaluation. The grayscale contrast in a neighboring region of the low grayscale levels (0.1 or less in relative luminance) is therefore shown in FIG. 14. Features of each tested display become obvious from FIG. 14. A sense of contrast between black and white becomes significantly inferior at contrast ratios of 50:1 or less, so the contrast ratio of 50:1 is a very important critical value. Display B in the comparative example cannot maintain the contrast ratio of 50:1 for the relative luminance level of 0.05 in the TV broadcast. This is because the luminance in the black state is too high (i.e., too low in panel contrast). Conversely, to maintain the contrast ratio of 50:1 for the relative luminance level of 0.05, a panel contrast ratio of at least 1000:1 is required, which agrees well with the sensory test results.

At a relative luminance level of 0.04 (4%), on the other hand, the contrast ratio reaches 50:1 or more. In the present embodiment, display panel A exceeds 50:1. The sensory test results also respond as such.

In addition, it is important to evaluate viewing-angle characteristics under TV-watching conditions. For High-Vision (high-resolution) broadcasts, it is appropriate to watch at a distance of 3H (three times a vertical size of a display panel with an aspect ratio of 9:16) from the panel. This is because it is appropriate to watch from one edge of the panel to another edge at an angle of 33 degrees in order to get a sense of immersion. The grayscale contrast of 50:1 at the relative luminance level of 0.05 within an angle range of 33 degrees is therefore a characteristic to which most importance is attached.

Figure 15:
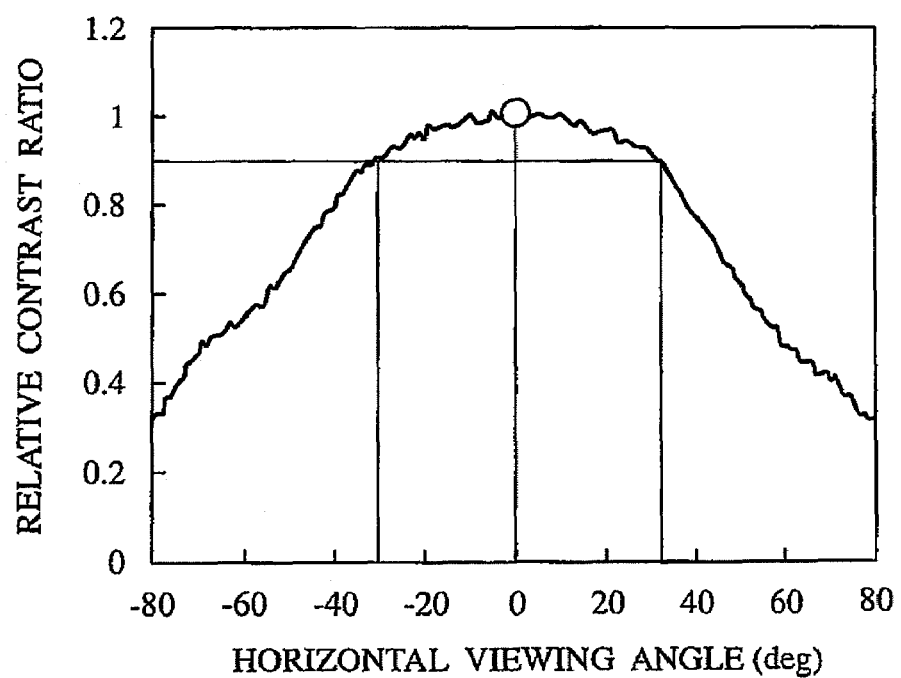
FIG. 15 shows an example of changes in the contrast ratio in a horizontal direction of the liquid-crystal display device according to the present invention.

FIG. 15 shows a relationship between a horizontal viewing angle and a contrast ratio. In the display devices of the present embodiment, the contrast ratio at a horizontal viewing angle of 33 degrees decreases by about 10% of a front contrast level. Panels A and C achieve the grayscale contrast of 50:1 at the relative luminance level of 0.05 within the viewing angle range of 33 degrees. It can be seen, therefore, that displays with a panel contrast ratio of at least 1200:1 are preferable for use as TVs. In addition, display panel A with a panel contrast ratio of 1500:1 can maintain the grayscale contrast ratio of 50:1 for the relative luminance level of 0.04, even within the viewing angle range.

It is obvious from the above results that a panel contrast ratio of at least 1000:1 is necessary. It can also be seen that the panel contrast ratio of 1200:1 is more preferable for watching TV, and that 1500:1 is a level at which the panel can supply sufficient image quality for watching movies (images substantially of low grayscale levels).

In the present invention, comparisons have been conducted only in panel contrast. However, data further improved over the panel contrast can be obtained by, for example, adjusting the luminance of the backlights according to ALL or controlling the grayscale levels (gamma characteristics) of the backlights according to ALL, and using the definitions of the dynamic gamma-contrast and the practical contrast. Maximum sensitivity as human visual perception, for example, is said to range from 100:1 to 200:1 in contrast ratio. If a desired grayscale contrast ratio for the relative luminance level of 0.05 is 100:1, therefore, the panel contrast ratio required is 1850:1, but the present inventors expect the dynamic gamma-contrast and the practical contrast to be achievable at the panel contrast ratio of 1500:1.

Applications of the present invention cover substantially all kinds of liquid-crystal display devices.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A liquid-crystal display device comprising:
   a liquid-crystal panel including a pair of substrates, a liquid-crystal layer held in sandwiched form between the pair of substrates, and a common electrode, a signal electrode and a scan electrode formed on at least a counterpart of the pair of substrates for applying an electric field to the liquid-crystal layer;
   a pair of polarizers disposed on a pair of substrates; and
   a light source unit disposed outside the pair of substrates,
   wherein the liquid-crystal layer includes a liquid-crystal material having an ordinary-light refractive index of at least 1.46, but up to 1.49, an extraordinary-light refractive index of at least 1.54, but up to 1.59, and a mean photoelastic constant of at least $8 \times 10^{-12}$N, but up to $25 \times 10{-12}$N, and exhibiting a nematic phase,
   where the liquid crystal of the liquid crystal layer is aligned in a direction of the scan electrode.

2. The liquid-crystal display device according to claim 1, wherein a retardation obtained by multiplying birefringence of the liquid-crystal material and thickness of the liquid-crystal layer is at least 0.32, but up to 0.40.

3. The liquid-crystal display device according to claim 1, wherein the mean photoelastic constant of the liquid-crystal material is at least $9 \times 10^{-12}$N, but up to $20 \times 10^{-12}$N.

4. The liquid-crystal display device according to claim 1, wherein the liquid-crystal layer is formed upon an optical sheet formed at the uppermost section of the light source unit.

5. The liquid-crystal display device according to claim 1, wherein a grayscale contrast ratio expressed as a ratio between a relative luminance level of 5% of maximum display luminance and a minimum luminance level is at least 50:1.

6. The liquid-crystal display device according to claim 1, wherein a grayscale contrast ratio expressed as a ratio between a relative luminance level of 4% of maximum display luminance and a minimum luminance level is at least 50:1.

7. The liquid-crystal display device according to claim 1, wherein a grayscale contrast ratio expressed as a ratio between a relative luminance level of 5% of maximum display luminance and a minimum luminance level is at least 50:1 within a vertical angle range of 33 degrees with respect to a horizontal direction of the panel.

8. The liquid-crystal display device according to claim 1, wherein the liquid crystal layer includes the mean photoelastic constant of at least $10 \times 10^{-12}$N, but up to $20 \times 10^{-12}$N.

9. The liquid-crystal display device according to claim 1, wherein the liquid crystal layer includes the mean photoelastic constant of at least $11.5 \times 10^{31\ 12}$N, but up to $20 \times 10^{31\ 12}$N.

10. The liquid-crystal display device according to claim 1, wherein the liquid crystal layer includes the mean photoelastic constant of at least $15 \times 10^{31\ 12}$N, but up to $20 \times 10^{31\ 12}$N.

* * * * *